United States Patent [19]

Ogasawara et al.

[11] 4,340,819
[45] Jul. 20, 1982

[54] PHOTOELECTRIC ELEMENT ARRAY WITH AUTOMATIC CONTROL OF THE CHARGE STORAGE TIME

[75] Inventors: Akira Ogasawara, Yokohama; Hiroshi Shirasu, Kawasaki; Ken Utagawa, Yokohama, all of Japan

[73] Assignee: Nippon Kogaku K.K., Tokyo, Japan

[21] Appl. No.: 258,763

[22] Filed: Apr. 29, 1981

Related U.S. Application Data

[63] Continuation of Ser. No. 105,271, Dec. 19, 1979, abandoned.

[30] Foreign Application Priority Data

Dec. 22, 1978 [JP] Japan .................................. 53/158845
Dec. 29, 1978 [JP] Japan .................................. 53/163079

[51] Int. Cl.³ ............................................. H01J 40/14
[52] U.S. Cl. ..................................................... 250/578
[58] Field of Search ..................... 250/211 J, 578, 209; 357/24, 30, 31, 32

[56] References Cited

U.S. PATENT DOCUMENTS 3,944,816  3/1976  Harada .............................. 250/211 J
4,000,418  12/1976  Waldron et al. ....................... 357/32
4,093,866  6/1978  Kasdan et al. ........................ 250/578

*Primary Examiner*—David C. Nelms
*Attorney, Agent, or Firm*—Shapiro and Shapiro

[57] ABSTRACT

This specification discloses a photoelectric converter device in which the output of a charge storage type photoelectric element array is fed back to a circuit for driving the array to thereby automatically control the charge storage time.

9 Claims, 14 Drawing Figures

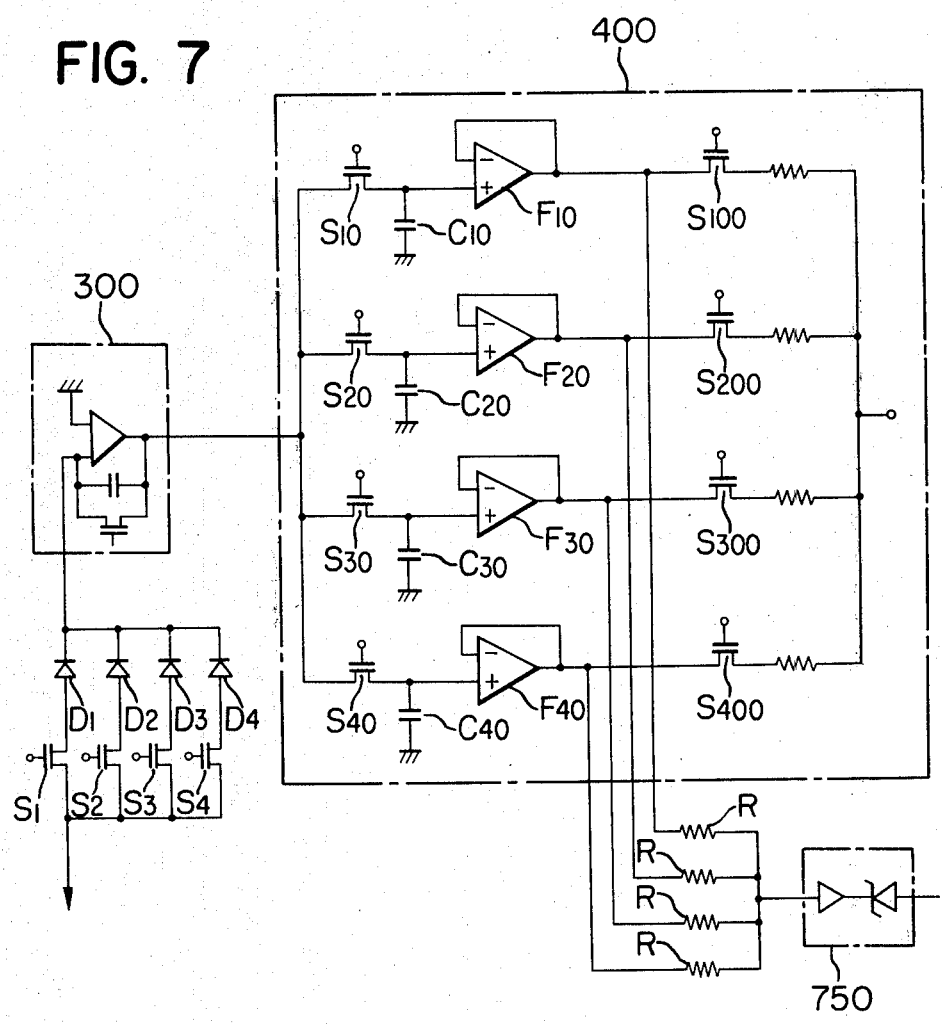

4,340,819

PHOTOELECTRIC ELEMENT ARRAY WITH AUTOMATIC CONTROL OF THE CHARGE STORAGE TIME

This is a continuation application of U.S. Ser. No. 105,271, filed Dec. 19, 1979, now abandoned.

BACKGROUND OF THE INVENTION

1. Field of the Invention

This invention relates to a photoelectric converter device using a charge storage type photoelectric element array to convert a light image formed thereon into an electrical signal.

2. Description of the Prior Art

A charge storage type photoelectric element array such as photodiode array, CCD (charge coupled device) or BBD (backet brigade device) storages charges generated in accordance with the intensity of incident light and generates a photoelectric output related to the intensity of the light and the storage time and so, the photoelectric output can be increased or decreased by controlling the charge storage time. Accordingly, in the case of dark light image, the photoelectric output can be rendered to a substantially constant value by increasing the charge storage time, and in the case of a very bright light image, the photoelectric output can be rendered to a substantially constant value by reducing the charge storage time.

SUMMARY OF THE INVENTION

It is the object of the present invention to provide a photoelectric converter device in which the output of a charge storage type photoelectric element array is fed back to a circuit for driving the array to thereby automatically control the charge storage time.

The invention will become more fully apparent from the following detailed description thereof taken in conjunction with the accompanying drawings.

BRIEF DESCRIPTION OF THE DRAWINGS

FIGS. 6a, 6b and 6c show the waveforms of pulses generated in the circuit of FIG. 5.

FIG. 7 is a circuit diagram showing another embodiment in which part of the FIG. 2 embodiment is modified.

DESCRIPTION OF THE PREFERRED EMBODIMENTS

Figure 1:
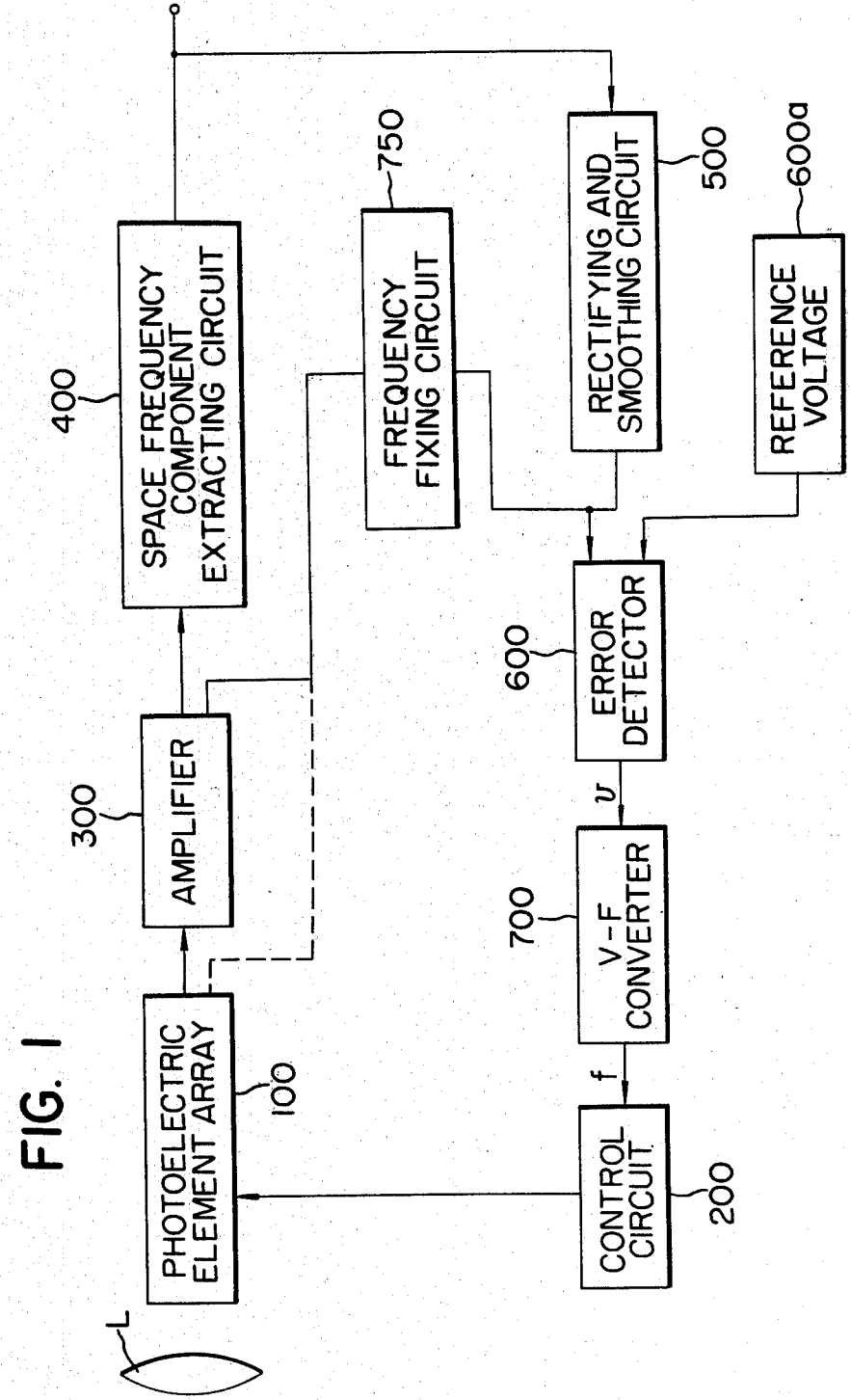
FIG. 1 is a block diagram of the photoelectric converter device according to the present invention.

The invention will hereinafter be described with respect to embodiments thereof shown in the drawings. As an embodiment, there is shown an example in which the present invention is applied to a displacement detecting photoelectric converter device which extracts a specific spatial frequency component from a light image projected upon a photoelectric element array and detects the displacement of the light image in the direction of arrangement of the array.

In FIG. 1, a charge storage type photoelectric element array 100 such as photodiode array, CCD or BBD is provided on or in the vicinity of the focal plane of an image forming lens L, and the photoelectric output of each photoelectric element forming this array represents the illumination distribution of the light image of an object formed by the image forming lens L. The charge storage times of the photoelectric elements are all the same and the storage times are controlled on the basis of the pulse output of a control circuit 200. The photoelectric output of the array is amplified by an amplifier 300.

The amplified photoelectric output is delivered to a specific spatial frequency component extracting circuit 400, which extracts a specific spatial frequency component having a spatial period, for example, of the order of mm or 0.1 mm in the light image. The extracting circuit 400, the array 100 and the amplifier 300 constitute a photoelectric converting portion. The phase of the AC output of the extracting circuit 400 represents the relative positional relation between the specific spatial frequency component in the light image and the array 100. When the light image is displaced in the direction of arrangement of the array, the phase thereof is correspondingly varied and so, the displacement of the light image can be detected by measuring the phase. However, where the charge storage times of the photoelectric elements are rendered equal for both the light image in which a great deal of specific spatial frequency component is contained and the light image in which a slight amount of specific spatial frequency component is contained, the amplitude of the AC output of this circuit depends on the amount of the component and the amplitude becomes small if the amount of the component is small. If the amplitude of the output of the extracting circuit 400 is so greatly varied by various light images, the accuracy of the phase measurement will be aggravated. Therefore, in this embodiment, a feedback is applied to the control circuit 200 so that the amplitude is constant as follows independently of the amount of the specific spatial frequency component.

A rectifying and smoothing circuit 500 rectifies and smoothes the output of the extracting circuit 400. An error detector 600 detects the difference between the output voltage of the rectifying and smoothing circuit 500 and the reference voltage of a reference voltage source 600a. The detection output of the error detector 600 is imparted to a V-F converter 700, which generates an output signal of a frequency corresponding to the error voltage. The control circuit 200 controls the charge storage time of each photoelectric element of the array 100 on the basis of the output frequency of the V-F converter 700.

A feedback circuit comprising the rectifying and smoothing circuit 500, the error detector 600 and the V-F converter 700 applies a feedback so that the amplitude of the AC output of the spatial frequency component extracting circuit 400 becomes a substantially constant value.

Assuming that from the condition in which this device is balanced and the said amplitude is at a constant value, the light image is varied and a light image containing a smaller amount of extracted spatial frequency component is projected, the difference between the outputs of the photoelectric elements becomes smaller so that the amplitude of the AC output of the spatial frequency component extracting circuit 400 becomes smaller than said constant value. Accordingly, the DC output of the rectifying and smoothing circuit 400 is also reduced below the reference voltage and the error detector 600 detects this difference. Thereupon, the output frequency of the V-F converter 700 is reduced and the control circuit 200 increases the storage times of the photoelectric elements of the array 100 until the amplitude of the output of the spatial frequency component extracting circuit 400 assumes said constant value. When this constant value is reached, the output of the rectifying and smoothing circuit 500 becmes coincident with the reference voltage and the output of the error detector 600 becomes stable at this balance point, and such condition is maintained unless the light image is varied. Next, when a light image containing a greater amount of extracted spatial frequency component is projected from this condition, the output frequency of the V-F converter 700 is increased by an action just opposite to what has been described above, and the storage time is reduced and again control is effected so that the amplitude of the spatial frequency component extracting circuit 400 assumes the constant value.

In this manner, the charge storage time of the array can be continuously and automatically controlled in accordance with the light image by the feedback circuit including the V-F converter, whereby the output of the extracting circuit 400 can be rendered to the constant value indepdently of the light image.

However, where the V-F converter is so used, the output frequency is reduced to prolong the storage time when the light image contains a smaller amount of the specific spatial frequency component. When the array 100 receives a light image of uniform illumination distribution such as the light image of a black plate or a white plate (that is, a light image containing a smaller amount of the specific spatial frequency component to be extracted), the V-F converter may continue to reduce the output frequency until at last the oscillation is stopped. Also, even when the oscillation is not stopped, if a light image of uniform illumination distribution is projected upon the array, the V-F converter wastefully reduces the output frequency. Accordingly, when, instead of such light image, a light image having the same brightness but having a great deal of the specific spatial frequency component to be extracted, is projected, there is required a long time before the V-F converter output assumes an approriate frequency for this new light image.

The present embodiment prevents such undesirable situation by a frequency fixing circuit 750. When the array 100 receives an image such as the image of a white plate which is bright but contains little extracted spatial frequency component, the output amplitude of the space frequency component extracting circuit 400 is very small and therefore, the output of the rectifying and smoothing circuit 500 is also much smaller than the reference voltage of the reference voltage source 600a and thus, the output frequency of the V-F converter 700 is reduced. By this, the charge storage time is increased and the output of each photoelectric element is also increased. The frequency fixing circuit 750 detects that this photoelectric output itself or the photoelectric output amplified by the amplifier 300 has assumed a certain predetermined value, for example, the saturation value of the output of the charge storage type photoelectric element and as a result, it generates an output equal to the reference voltage of the reference voltage source 600a to thereby fix the output frequency of the V-F converter to the frequency at the time of detection thereof, independently of the output of the rectifying and smoothing circuit 500. In this case, the image is bright and so, before the output frequency of the V-F converter 700 is so much reduced, the frequency fixing circuit 750 is operated to prevent the wastefully frequency reduction of the converter 700.

Likewise, in a case where an image such as the image of a black plate which contains little extracted spatial frequency component and which is dark is projected upon the array 100, the V-F converter 700 is fixed to a certain frequency without stopping oscillation by the operation of the frequency fixing circuit 750. Of course, this light image is dark and so, in the condition wherein the charge storage time has become sufficiently longer than in the preceding example, the photoelectric output or the amplified output thereof reaches said predetermined value of the frequency fixing circuit 750 and therefore, the fixed frequency at this time is lower than that in the preceding example, in conformity with the brightness of the image.

Even if the image is further darker and the output frequency of the V-F converter 700 is reduced to such an extent that it stops oscillation, it is possible that the photoelectric output or the amplified output thereof does not reach the predetermined value of the frequency fixing circuit 750. Accordingly, the V-F converter 700 may preferably be constructed so that the output characteristic thereof is saturated below a certain frequency.

Of course, even if the V-F converter is thus temporally locked by the frequency fixing circuit 750, when a light image sufficiently containing an extracted spatial frequency component is next projected upon the array 100, the charge storage time is controlled so that the frequency fixing circuit 750 becomes inoperative or the output of the rectifying and smoothing circuit 500 becomes great and the V-F converter 700 becomes unlocked and the output amplitude of the spatial frequency component extracting circuit 400 assumes a predetermined value.

Figure 2:
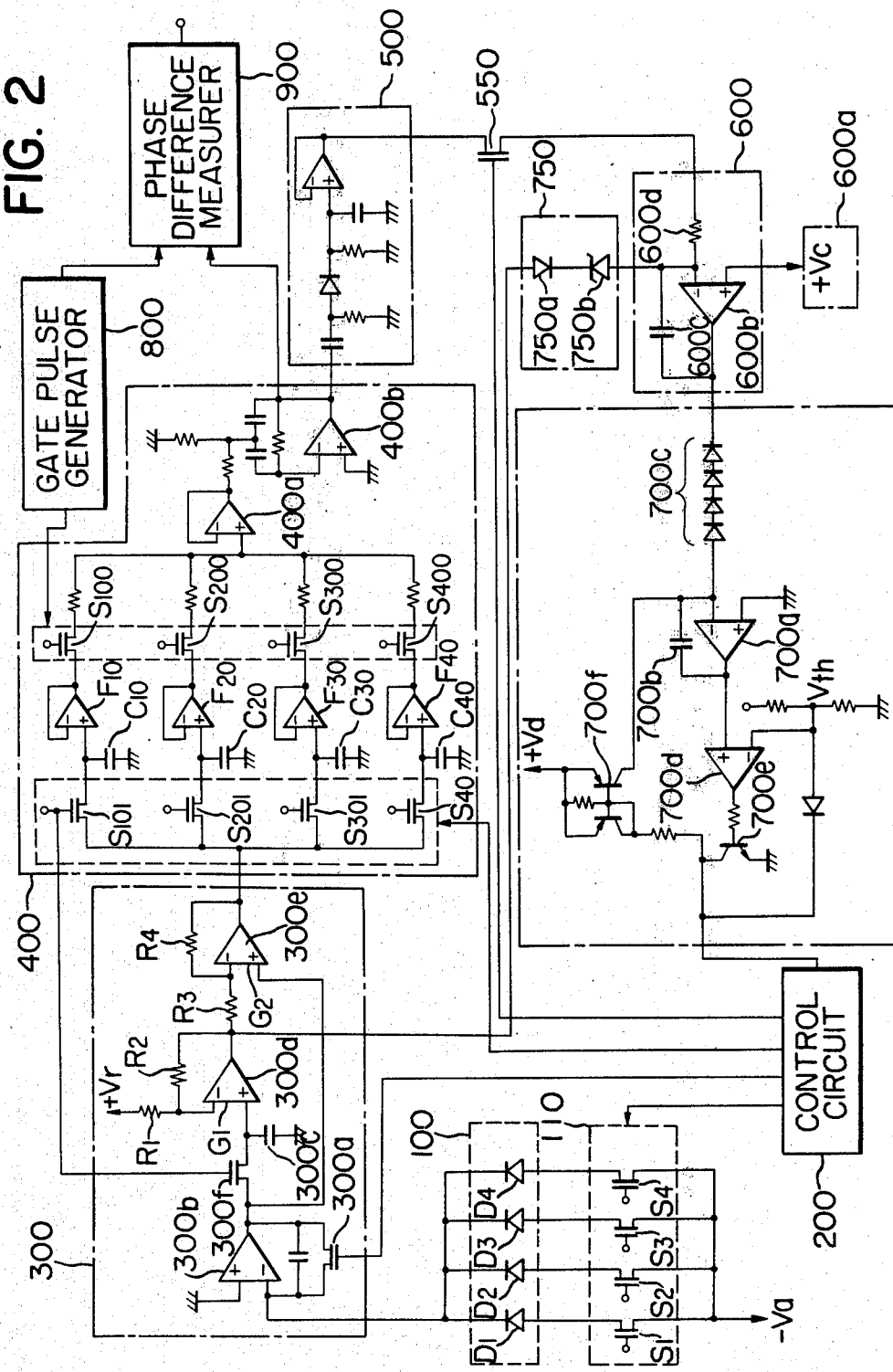
FIG. 2 is a circuit diagram showing a specific embodiment of the device of FIG. 1.

The specific circuit of the photoelectric converter device shown in FIG. 1 is shown in FIG. 2. In FIG. 2, photodiodes $D_1-D_4$ constitute the array 100, and serial switching elements $S_1-S_4$ constitute a switch group 110. The switches $S_1-S_4$ of the switch group 110 are successively switched on by the gate pulses $G_{a1}-G_{a4}$ of FIG. 3A from the control circuit 200, and output signal voltages $e_1-e_4$ provided by the storaged charges of the photodiodes $D_1-D_4$ are successively applied to a sample hold circuit 300b in the amplifier circuit 300 at a cycle period $T_1$ and with a gap of a predetermined time lag $t_1$. Speaking in detail, when the switching element $S_1$ is switched on by the pulse $G_{a1}$, the output of the photodiode $P_1$ is fed to the sample hold circuit 300b. After the time $t_1$ from the generation of the pulse $G_{a1}$, the switching element $S_2$ is switched on by the pulse $G_{a2}$ so that the output of the photodiode $P_2$ is fed to the sample hold circuit 300b. The switching elements $S_3$ and $S_4$ are switched on by the successive pulses $G_{a3}$ and $G_{a4}$, respectively, in the same manners. FET switch 300a is switched on by the gate pulse Gb of FIG. 3B from the control circuit 200 at the timing immediately before the outputs $e_1-e_4$ from the photodiodes $D_1-D_4$ enter the sample hold circuit 300b, thereby resetting the sample hold circuit 300b. FET switch 300f is switched on by the gate pulse $G_{c1}$ of FIG. 3C from the control circuit 200 only immediately after the output $e_1$ from the photodiode $D_1$ is put out to the sample hold circuit and therefore, the value of the output $e_1$ is accumulated or stored in a capacitor 300c for the cycle period $T_1$. Thus, the output V of the amplifier circuit 300 is expressed as $V = G_1 \cdot G_2 \cdot V_r - (1+G_1)G_2 \cdot v_1 + (1+G_2)v_2$ (where $G_1$ and $G_2$ are the gains of amplifiers 300d and 300e and respectively are $R_2/R_1$ and $R_4/R_3$, $+V_r$ is the voltage applied to resistor $R_1$, $v_1$ is the output voltage of sample hold circuit 300b, and $v_2$ is the stored voltage of capacitor 300c, namely, $v_2 = e_1$), if the resistance value is selected so that $$G_1 \cdot G_2 = \frac{R_2 R_4}{R_1 R_3} = 1, V = V_r + (1 + G_2)(v_1 - e_1)$$

consequently, since the output voltage $v_1$ of the circuit 300b becomes $e_1$, $e_2$, $e_3$ and $e_4$ in succession, the outputs $V_1$–$V_4$ of the amplifier circuit when the output signals $e_1$–$e_4$ from the photodiode array 100 are successively applied as input become as follows:

$$V_1 = V_r$$

$$V_2 = V_r + (1+G_2)(e_2 - e_1)$$

$$V_3 = V_r + (1+G_2)(e_3 - e_1)$$

$$V_4 = V_r + (1+G_2)(e_4 - e_1)$$

Figure 3A:
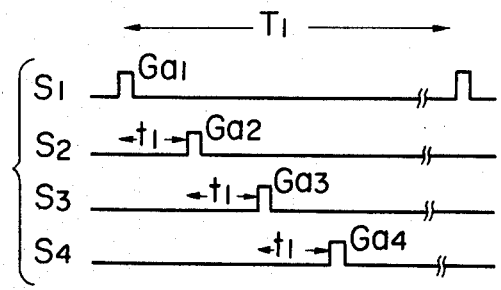
FIGS. 3a, 3b and 3c as well as 4a, 4b, 4c and 4d show the waveforms of pulses generated in various portions of the FIG. 2 circuit.
Figure 3B:
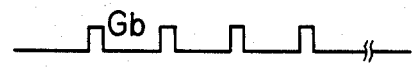
Figure 3C:
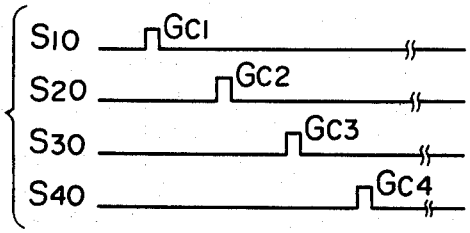
Figure 4A:
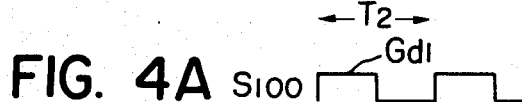
Figure 4B:
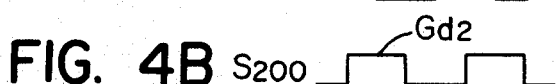
Figure 4C:
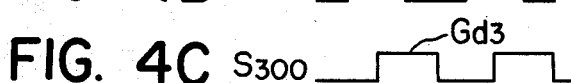
Figure 4D:
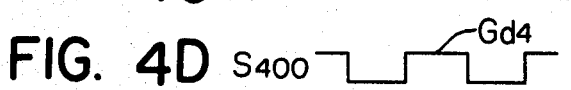

These outputs $V_1$–$V_4$ are successively stored in capacitors $C_{10}$–$C_{40}$ by the gate pulses $G_{c1}$–$G_{c4}$ of FIG. 3C from the control circuit 200 being applied to the FET switches $S_{10}$–$S_{40}$ of the extracting circuit 400. In this manner, by the amplifier 300, a predetermined value $V_1$, i.e. $V_r$, is stored in a hold circuit comprising capacitor $C_{10}$ and voltage follower $F_{10}$, independently of the output $e_1$ of the photodiode $D_1$, and voltages $V_2$, $V_3$ and $V_4$ are respectively stored in hold circuits comprising capacitors and followers $C_{20}$, $F_{20}$, $C_{30}$, $F_{30}$ and $C_{40}$, $F_{40}$. To extract the desired spatial frequency component, the differences between the outputs $e_1$–$e_4$ of the photodiodes are necessary and therefore, the amplifier 300 which amplifies only such differences as described above is very preferable. The voltages $V_1$–$V_4$ thus stored are read out by the gate pulses $G_{d1}$–$G_{d4}$ of FIG. 4 having a period $T_2$ ($T_2 < T_1$) and time-delayed y $T_2/4$ each being applied from a gate pulse generator 800 to FET switches $S_{100}$–$S_{400}$, and are added together and converted into a current by a current addition and current/voltage converting circuit 400a, and the frequency component of $1/T_2$ is extracted therefrom by a band-pass filter 400b.

The output of the extracting circuit 400 so obtained, as fully disclosed in U.S. application Ser. No. 972,261, is the light image component of spatial frequency 1/d lines/mm, where d mm is the length of the photodiode array 100, namely, the length of the four photodiodes $D_1$–$D_4$ in the direction of arrangement thereof, and the amplitude of the extracted output represents the amount of the extracted spatial frequency component and the phase thereof represents the relative position of the light image and the array. applied to a phase difference measurer 900. Since the phase of the AC output of the extracting circuit 400 represents the relative positional relation between the light image and the array as described above, displacement of the light image can be detected by measuring the phase difference between the signal of period $T_2$ from the gate pulse generator 800 synchronized with the control signals of the switching elements $S_{100}$–$S_{400}$ and the output signal of the extracting circuit 400 by the phase difference measurer 900.

On the other hand, the output of the extracting circuit 400 is fed back to control the frequency of the output of the V-F converter 700, and is applied as input to the rectifying and smoothing circuit 500. The construction of the rectifying and smoothing circuit 500 in the present embodiment is of the known type and need not be described herein. The AC output of the extracting circuit 400 is smoothed and applied as a direct current representing the average value level to the error detector 600 through FET switch 550.

The frequency fixing circuit 750 comprises a diode 750a and a Zener diode 750b. The input of the circuit 750 is the output of an operational amplifier 300d which amplifies the photoelectric output of the photodiode $D_1$, and the output of the circuit 750 is supplied to the input of the error detector 600.

The error detector 600 is an integrator comprising an operational amplifier 600b, its feedback capacitor 600c and a resistor 600d. It integrates the difference voltage between the output from the rectifying and smoothing circuit 500 and the reference voltage $V_c$ of the reference voltage source 600a. The integrated amount of this detected difference voltage controls the V-F converter 700 to vary the frequency.

The output frequency of this V-F converter 700 is an exponential function of the input voltage. That is, $$f = A e^{cv}$$

where
 f: output frequency
 v: input voltage, namely, output of the error detector 600
 A, C: constant The exponential characteristic of the output frequency f for such input voltage v is attributable to a plurality of diodes 700c provided in the input portion of the V-F converter 700, and the diodes 700c convert the input voltage into a charging current which provides the exponential function thereof, thereby charging an integrating capacitor 700b. In the other points, the construction of the V-F converter 700 is similar to that of the conventional V-F converter.

Operation of the V-F converter 700 will now be considered. A current corresponding to the output voltage of the error detector 600 flows through the feedback capacitor 700b and the plurality of diodes 700c to charge the capacitor 700b. Accordingly, the output voltage of the operational amplifier 700a is gradually increased. When this voltage exceeds the reference voltage Vth of a comparator circuit 700d, output transistor 700e is turned on to supply output pulse to the control circuit 200. By the turn-on of the output transistor 700e, a current supply circuit 700f is operated to momentarily reversely charge the feedback capacitor 700b, namely, cause this capacitor to discharge. By this, the output voltage of the operational amplifier 700a momentarily restores its initial condition and again starts to charge the feedback capacitor 700b, thus repeating the above-described operation.

Why an exponential characteristic is imparted to the output frequency of the V-F converter will now be described.

If $f = A \cdot e^{cv}$, the relative variation rate $\Delta f/f/\Delta v$ of the output frequency to the variation $\Delta v$ in input voltage assumes a constant value c which is independent of the output frequency f. Accordingly, the response speed of this photoelectric converter device to the variation in image light becomes constant independently of the output frequency. However, if the V-F characteristic is in a proportional relationship, namely, if $f=Bv$, the relative variation rate becomes $\Delta f/f/\Delta v = B/f$ and depends on the output frequency f. Therefore, the relative variation rate in low frequencies becomes greater so that this photoelectric converter device becomes readier to oscillate and if one tries to prevent such oscillation, the response speed of the photoelectric converter device in high frequencies becomes aggravated.

Next, the operation of the device shown in FIG. 2 will be described. For example, when a light image containing a smaller amount of specific spatial frequency component to be extracted is projected upon the array 100 from the condition in which this device is normally operating, the output of the rectifying and smoothing circuit 500 becomes smaller than the reference voltage $+VC$ of the error detector 600 and therefore, the negative output $-v$ of the error detector 600 is increased, that is, $|v|$ becomes smaller. Accordingly, the output frequency f of the V-F converter 700 becomes smaller and the control circuit 200 increases the scanning period $T_1$ of the switches $S_1-S_4$, namely, the storage period $T_1$ of the photodiodes $D_1-D_4$, until the output of the rectifying and smoothing circuit 500 becomes equal to $+Vc$. Of course, at this time, the conduction periods of reset switch 300a and switches $S_{10}-S_{40}$ are likewise increased.

Conversely, for a light image containing a greater amount of spatial frequency component to be extracted, the output frequency is increased by an operation entirely reverse to what has been described above, to bring the output amplitude of the spatial frequency component extracting circuit 400 to a predetermined value.

On the other hand, when a light image containing an extremely small amount of spatial frequency component to be extracted is projected, the output of the operational amplifier 300d exceeds the sum of the Zener voltage of the Zener diode 750b, the conduction voltage of the diode 750a and the reference voltage $+Vc$ of the reference voltage source 600a, whereupon the frequency fixing circuit 750 is operated to fix the V-F converter 700 so that it is not reduced below the frequency at this point of time.

In the foregoing description, the switching element 550 has been described as always conducting, but the following advantage is provided by rendering the switching element 550 conductive for a predetermined time.

When this device is deviated from its balanced condition by a variation in light image, it can be brought back to its balanced condition by causing the FET switching element 550 provided between the rectifying circuit 500 and the detecting circuit 600 to conduct only once for a predetermined time $\Delta t$ during the storage time $T_1$ of the photodiode irrespective of the scanning frequency. This will hereinafter be described in detail. The conduction time $\Delta t$ of the FET switch 550 is the integration time of the detecting circuit 600, and in other words, it determines the amount of feedback. In the circuit of the embodiment shown in FIG. 2, when the output of the smoothing circuit 500 is descreased by $\Delta v_{10}$, the detecting circuit 600 integrates the variation $\Delta v_{10}$ for a predetermined time period $\Delta t$ and produces the variation $\Delta v$ in the integration output. This variation $\Delta v$ causes the output frequency of the V-F converter to be lowered by $\Delta f$. The frequency variation $\Delta f$ increases the outputs of the photodiodes $D_1-D_\Delta$ thereby increase the output of the smoothing circuit 500 by $\Delta v_{10}$. In other words, the condition $\Delta f/f = \Delta v_{10}/Vc$ means the balanced condition. From this condition, the time period $\Delta t$ is obtained. When the output of the rectifying and smoothing circuit 500 is varied by $\Delta v_{10}$ from the balanced condition $+Vc$ and becomes $Vc + \Delta v_1$, this is applied to the detecting circuit 600 through the FET switch 550 for the time period $\Delta t$. If the integration output of the detecting circuit 600 is thereby varied by $\Delta v$, $\Delta v = \Delta t/C_1R\cdot\Delta v_{10}$, where $C_1$ is the capacity of capacitor 600c and R is the resistance value of input resistor 600d.

By this variation $\Delta v$ in integration output, the output frequency of the V-F converter 700 is varied by $\Delta f$. The relative variation $\Delta f/f$ is as follows, since $\Delta f/f/\Delta v$ is the constant value c as already described.

$$\Delta f/f = \frac{\Delta f/f}{\Delta v} \times \Delta v = c \times \frac{\Delta t \cdot \Delta v_{10}}{RC_1}$$

When the relative variation $\Delta f/f$ of this frequency is equal to the relative variation $\Delta v_{10}/V_c$ of the integration input, the balanced condition is again brought about and hence, $$c \times \frac{\Delta t \cdot \Delta v_{10}}{RC_1} = \frac{v_{10}}{Vc} \therefore \Delta t = \frac{RC_1}{Vc \cdot C}$$

As is apparent from this last equation, the time $\Delta t$ is a value independent of the output frequency f and therefore, by selecting the conduction time $\Delta t$ of the FET swtich 550 to this value, the balanced condition can be restored by one conduction of the FET switch 550 whatever value the output frequency f of the V-F converter may assume. The value $\Delta t$ may be one approximately given by the above last equation and the balanced condition is almost restored by one conduction of the FET switch 550, and a great overshoot or too low a response speed is thus avoided.

Figure 5:
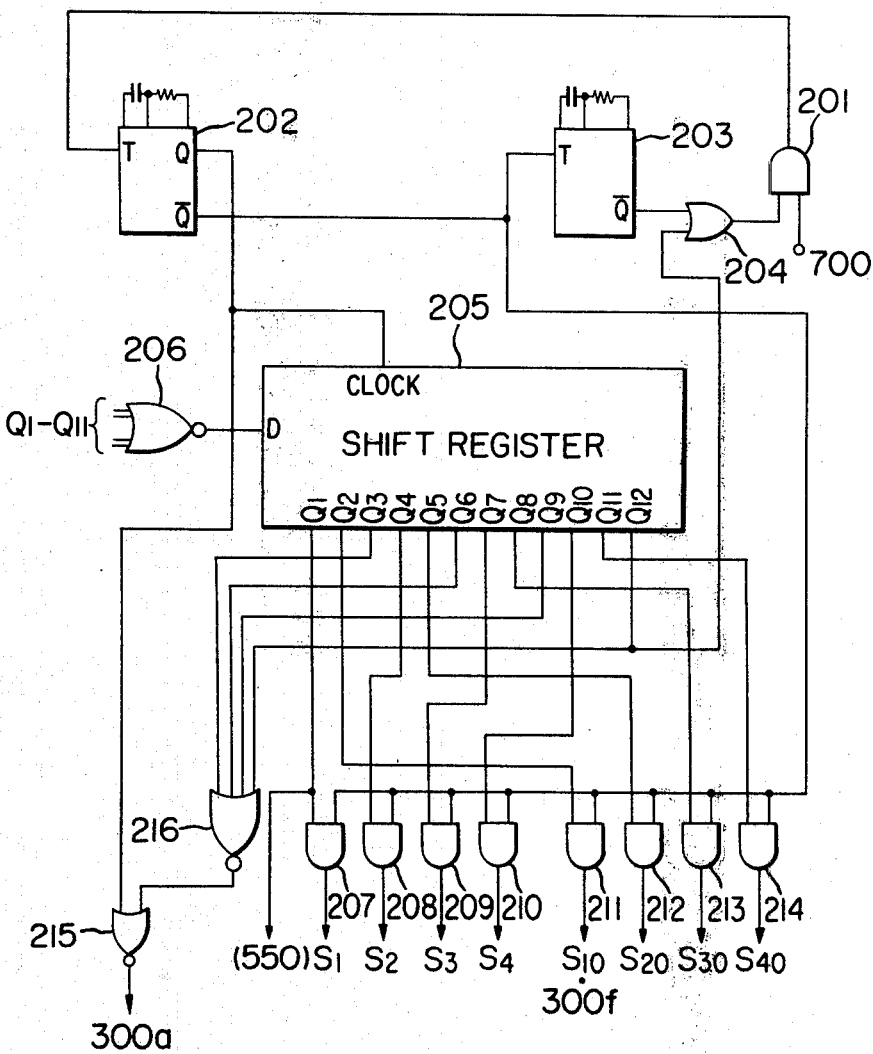
FIG. 5 is a circuit diagram showing the control circuit.

A specific example of the control circuit 200 will be described. In FIG. 5, the output of the V-F converter 700 is applied to one input terminal of an AND gate 201. The output terminal of the AND gate 201 is connected to the T input terminal of a one-shot multivibrator 202. The Q output terminal of the multivibrator 202 is connected to the T input terminal of another one-shot multivibrator 203. The $\overline{Q}$ output terminal of this multivibrator 203 is connected to the other input terminal of the AND gate 201 through an OR gate 204. The $\overline{Q}$ output terminal of the multivibrator 202 is connected to the clock input terminal of a shift register 205. The output terminal of a NOR gate 206 is connected to the D input terminal of the shift register 205. The register 205 has twleve parallel output terminals $Q_1-Q_{12}$, of which the terminals $Q_1-Q_{11}$ are connected to the input of the NOR gate 206. The outputs terminals of AND gates 207–210 are connected to the FET switches $S_1-S_4$ of FIG. 2, respectively. The output terminals of AND gates 211–214 are connected to FET switches $S_{10}-S_{40}$, respectively. NOR gate 215 receives as input the Q output of the multivibrator 202 and the output of NOR gate 216, and the output of the gate 215 is connected to the gate of a reset switch 300a.

Operation will now be described. As shown in FIG. 6A, when the rising of the negative output pulse of the V-F converter 700 is applied to the multivibrator 202 through the AND gate 201, the multivibrator 202 generates a positive pulse as shown in FIG. 6B at its Q output terminal and a negative pulse at its $\overline{Q}$ output terminal. By the rising of the above-mentioned negative pulse, the multivibrator 203 puts out a negative pulse as shown in FIG. 6C at its $\overline{Q}$ output terminal. The rising of the negative pulse of this multivibrator 203 is sent to the multivibrator 202 through the OR gate 204 and the AND gate 201. By this, the multivibrator 202 again generates a positive pulse and a negative pulse at its Q and $\overline{Q}$ output terminals, respectively. Thus, the multivibrators 202 and 203 are continuously driven by the mutual outputs with the output of the V-F converter as a start. On the other hand, the register 205 receives the H (high) level output of the NOR gate 206 at the rising of the first positive pulse of the Q output terminal of the multivibrator 202, and changes the output of the output terminal $Q_1$ into H level. The H level output received by the register 205 is transferred to the succeeding stages each time clock pulse is sent from the Q output terminal of the multivibrator 202, so that terminals $Q_2$, $Q_3$, ... assume H level in succession. Of course, when any one of the terminals $Q_1$–$Q_{11}$ assumes H level, the output of the NOR gate 206 assumes L (low) level and therefore, when one of the terminals $Q_1$–$Q_{11}$ is at H level, all the remaining terminals are at L level.

When the terminal $Q_1$ thus assumes H level, the AND gate 207 sends a gate pulse $G_{a1}$ shown in FIG. 3A to the FET switch $S_1$ and then, when the terminal $Q_2$ assumes H level, the AND gate 211 sends a gate pulse $G_{c1}$ shown in FIG. 3C to the FET switches 10 and 300f, and when the terminal $Q_3$ assumes H level, the NOR gate 215 sends a gate pulse shown in FIG. 3B to the FET switch 300a. Likewise, when the terminals $Q_4$–$Q_{12}$ successively assume H level, gate pulses shown in FIGS. 3A, B and C are successively generated. The H level output of the last stage output terminal $Q_{12}$ is sent to the multivibrator 202 through the OR gate 204 and the AND gate 201 and so, the $\overline{Q}$ output of the multivibrator 203 thereafter is neglected. Accordingly, the operations of the multivibrators 202 and 203 are stopped until the next output pulse from the V-F converter 700 is supplied.

In the embodiment shown in FIG. 2, the frequency fixing circuit 750 detects the photoelectric output only of one photodiode $D_1$ forming the photodiode array 100. However, in the case of such a special light image that the intensity of the light impinging on this photodiode $D_1$ remarkably differs from the intensity of the light impinging on the other photodiodes $D_2$–$D_4$, the frequency fixing circuit 750 of the first embodiment shown in FIG. 2 may not properly operate.

This is improved by a second embodiment shown in FIG. 7.

An amplifier circuit 300 generates not the difference between photoelectric outputs but outputs obtained by directly amplifying the photoelectric outputs. Accordingly, the amplified photoelectric outputs of the photodiodes are held in hold circuits $C_{10}$, $F_{10}$; $C_{20}$, $F_{20}$; $C_{30}$, $F_{30}$; and $C_{40}$, $F_{40}$ through switching elements $S_{10}$–$S_{40}$.

The output terminals of these hold circuits are commonly connected through identical resistors R. By this, the total output of all photodiodes $D_1$–$D_4$ of the photodiode array is applied to the frequency fixing circuit 750.

Thus, in this embodiment, the frequency fixing circuit 750 controls the V-F converter 700 on the basis of the total of the photoelectric outputs of all photodiodes and therefore, it can properly operate even for the very special light image as described above. Of course, the frequency fixing circuit 750 may control the V-F converter 700 either on the basis of the average photoelectric output of all photodiodes or on the basis of the photoelectric outputs of a suitable plurality of photodiodes in the photodiode array, to obtain the same effect.

The present embodiment is a photoelectric converter device for extracting a specific spatial frequency component contained in a light image, but the present invention is also applicable to various photoelectric converter, for example a photoelectric converter for bringing, the outputs of photoelectric elements, into a predetermined range independently of the average illumination of the image while preserving the relative output differences.

We claim:

1. A photoelectric converter device comprising:
   (a) an image forming optical system;
   (b) a photoelectric converting portion for photoelectrically converting a light image formed by said image forming optical system and generating an associated output voltage associated with the information contained in said light image, said photoelectric converting portion including a charge storage type photoelectric element array comprising a plurality of charge storage type photoelectric elements each of which stores charges generated in accordance with the intensity of incident light and generates a photoelectric output related to both the intensity of the light and the storage time; and
   (c) a control circuit for driving said photoelectric element array;
   the improvement comprising;
   (d) a feedback circuit (500, 600, 700) connected between said photoelectric converting portion (100, 300, 400) and said control circuit (200);
   said feedback circuit including a V-F converter (700) for receiving said associated output voltage as input and generating a frequency output corresponding thereto;
   said feedback circuit supplying the frequency output to said control circuit (200) to cause said control circuit (200) to control the charge storage time of said photoelectric element array (100) so that said associated output voltage becomes a substantially constant value independently of the light image.

2. A photoelectric converter device according to claim 1, further comprising a frequency fixing circuit (750) for detecting that the output of said photoelectric element array (100) has exceeded a predetermined value and fixing the output frequency of said V-F converter (750) independently of said associated output.

3. A photoelectric converter device according to claim 2, wherein said frequency fixing circuit (750) detects the photoelectric output of one of the photoelectric elements ($D_1$–$D_4$) of said photoelectric element array (100) and when it exceeds said predetermined value, fixes the output of said V-F converter (700).

4. A photoelectric converter device according to claim 2, wherein said frequency fixing circuit (750) detects an output comprising the sum of the photoelectric outputs of at least two of the photoelectric elements of said photoelectric element array and when it exceeds said predetermined value, fixes the output of said V-F converter.

5. A photoelectric converter device according to claim 1 or 2, wherein said V-F converter (700) generates an output frequency which is substantially an exponential function of the input voltage.

6. A photoelectric converter device according to claim 5, wherein said feedback circuit includes a reference voltage generating circuit (600a) and an integrator (600) for integrating the difference between the reference voltage of said reference voltage generating circuit and said associated output, the output of said integrator being supplied as the input of said V-F converter.

7. A photoelectric converter device according to claim 6, wherein said feedback circuit has switching means (550) for supplying said associated output to said integrator (600) for a predetermined time within said storage time.

8. A photoelectric converter device according to claim 1, wherein said photoelectric converting portion includes a spatial frequency component extracting circuit (400) for extracting a specific spatial frequency component from said light image and generating it as said associated output.

9. In a photoelectric converter device comprising:
an image forming optical system;
a photoelectric converting portion for photoelectrically converting a light image formed thereon by said image forming optical system and for generating an associated output corresponding to the information contained in said light image, said photoelectric converting portion including a charge storage type photoelectric element array comprising a plurality of charge storage type photoelectric elements, each of which stores charge generated in accordance with the intensity of incident light and generates a photoelectric output related to both the intensity of the light and to the charge storage time; and
a control circuit for driving said photoelectric element array,
the improvement comprising:
a feedback circuit connected between said photoelectric converting portion and said control circuit for receiving said associated output and for causing said control circuit to control the charge storage time of said photoelectric element array so that said associated output becomes a substantially constant value which is independent of the light image, and
a fixing circuit for detecting that the output of said photoelectric element array has exceeded a predetermined value and for causing said control circuit to fix the charge storage time of said photoelectric element array independently of said associated output.

* * * * *